United States Patent [19]

Squyres et al.

[11] Patent Number: 5,319,465
[45] Date of Patent: Jun. 7, 1994

[54] METHOD FOR GENERATING FILM QUALITY IMAGES ON VIDEOTAPE

[75] Inventors: R. Phillip Squyres, Woodland Hills; William R. Womack, Los Angeles; Alan A. Hart, Newhall, all of Calif.

[73] Assignee: Sony Pictures Entertainment, Inc., Los Angeles, Calif.

[21] Appl. No.: 763,367

[22] Filed: Sep. 20, 1991

[51] Int. Cl.$^5$ .............................................. H04N 5/782
[52] U.S. Cl. .................................. 358/310; 358/345; 358/346
[58] Field of Search ............... 358/335, 310, 906, 909, 358/345, 346, 209, 10, 139, 185, 97; H04N 5/782

[56] References Cited

U.S. PATENT DOCUMENTS

| | | | |
|---|---|---|---|
| 4,771,342 | 9/1988 | Beesley | 358/335 |
| 4,786,979 | 11/1988 | Claus et al. | 358/335 |
| 4,935,816 | 6/1990 | Faber | 358/160 |

Primary Examiner—Tommy P. Chin
Assistant Examiner—Huy Nguyen
Attorney, Agent, or Firm—Irell & Manella

[57] ABSTRACT

Production and post-production processes and equipment are modified to create a "film look", minimizing the need to introduce noise and artifacts into the video signal wherein the camera, lighting and post production processes are keyed to a film-generated benchmark to provide parameters which are followed during videotaping and post-production to generate "film look" images. The lighting of the sets to be videotaped are adjusted to be comparable to the lighting used for film and a benchmark film test is shot utilizing a video camera and a film camera. The producer of the film look video can review and adjust visual aspects of the film image to determine the "look" desired. Certain parameters from the benchmark are then utilized for camera settings and post production processes as well as lighting to generate the desired look. By quantifying these features or look in both production and post-production processes and procedures, the look desired can be mimicked quite closely without the undesirable artifacts which are found in prior art post production processes. Further, the film look can be repeated with respect to subsequent video productions to consistently provide the same quality and look without the need for further benchmark testing.

44 Claims, 3 Drawing Sheets

*Figure 1*

Modulation Transfer Function

Condition of measurement:
The Modulation Transfer function is measured by making electrically
The Fourier analysis of a line spread function, which is the intensity
distribution of the slit image projected by the test conditions below.

1. Channel :   Green Channel
              peak wavelength: 535nm,  Half width: 80nm
              tungsten lamp+G533 Filter+equiv.S-10 photomul.tube
2. Frequency: 33 line pairs/ns  317 TVL (4MHZ)
3. Focus position: The best focus position at the center of the image plane
4. Image magnification: 219x(f=7.5), 73x(f=40), 40.6x(f=150)
5. Image position:

Center :  1
Middle :  2
Corner :  3

Unit/nm

%

| Aperture | F/1.5(*F/1.9) | | | F/4.0 | | |
|---|---|---|---|---|---|---|
| Focal length (nm) | Center | Middle | Corner | Center | Middle | Corner |
| 7.5 | 90 | 82 | 75 | 94 | 92 | 89 |
| 40 | 94 | 93 | 78 | 94 | 93 | 90 |
| 150* | 89 | 82 | 72 | 93 | 91 | 80 |

METHOD FOR GENERATING FILM QUALITY IMAGES ON VIDEOTAPE

BACKGROUND OF THE INVENTION

1. Field of the Invention

The process of the present invention is related to the generation of film quality images using videotape production and post production procedures and equipment.

2. Art Background

The economies of videotape are well recognized in television production. Video cameras and equipment are more economical to use and the videotape image is immediately available for production purposes. However, it is also recognized that images recorded on videotape do not have the same pleasing "film look" as film. Although film produced images are aesthetically more pleasing, the film process and equipment is quite expensive and film production entails time consuming development and post production processes.

Several post production processes attempt to provide a "film look" to images shot originally on videotape. The first process, as set forth in U.S. Pat. No. 4,771,342 entitled Method and Apparatus for Enhancing Video-Recorded Images to Film Grade Quality, produces a composite video image and utilizing a composite video signal as input, modifies the signal to emulate the frame rate normally associated with film display and then adds certain color correction to provide gamma correction to the video signal using a grey scale typically associated with a motion picture film recording. Noise is also introduced into each frame of the video signal via a random noise generator in order to simulate the texture of emulsion film. However, this process degrades the quality of the final recorded video signal. The introduction of frame motion artifacts mimicking the artifact created when film is transferred to video also contributes to the degradation of the image. U.S. Pat. No. 4,935,816 entitled Method and Apparatus for Video Image Film Simulation describes a post-production process in which the video signal is modified to simulate film frame speed by summing a real time signal and delay signals to create an interpolation of preceding and succeeding video fields. Clipped filtered white noise is summed with the picture portion of the video signal to simulate the grain of film. This process is a post production process that similarly introduces undesirable signal noise and artifacts in an attempt to simulate a film image.

A commercially available process, "Film Finish ™ is a post production process offered by Planet Blue, Los Angeles, Calif., which performs digital color correction in the digital domain to provide a "film look".

Generally, the desired "look" may vary from producer to producer. Furthermore, as many different "film looks" exist, caused by variables of shooting film, such as film stock, laboratory and exposure practices, there are no specific requirements to follow in order to match the desired look.

SUMMARY OF THE INVENTION

It is therefore an object of the present invention to provide a video production process to achieve a "film look".

It is further an object of the present invention to provide a video production and post production process to achieve a "film look" on videotape while retaining the flexibilities and economies of videotape production and post production.

It is an object of the present invention to provide a video production process to provide a video having a film look which mimics a desired film image without adding signal degrading artifacts.

In the process of the present invention, production and post-production processes and equipment are modified to create a "film look", minimizing the need to introduce noise and artifacts into the video signal. The camera, lighting and post production processes are keyed to a film-generated benchmark to provide parameters which are followed during videotaping and post-production to generate "film look" video images. The lighting of the sets to be videotaped are adjusted to be comparable to the lighting used for film and a benchmark film test is shot utilizing a video camera and a film camera. The producer of the film look video can review and adjust visual aspects of the film image to determine the "look" desired. Certain parameters from the benchmark are then utilized for video camera settings and post production processes as well as set lighting to generate the desired film look on videotape. By quantifying these features or look in both production and post-production processes and procedures, the look desired can be matched quite closely without the undesirable artifacts which are found in prior art post production processes. Further, the film look can be repeated with respect to subsequent video productions to consistently provide the same quality and look without the need for further benchmark testing.

BRIEF DESCRIPTION OF THE DRAWINGS

The object, features and advantages of the process of the present invention will be apparent from the following detailed description of the preferred embodiment in which.

DETAILED DESCRIPTION OF THE INVENTION

As will be discussed below, a "film look" can be provided to a videotape image while maintaining the economies of video production and post production. The process of the present invention involves both video production and post production techniques. In the following description, numerous specific details are set forth, such as light settings, film stock, equipment utilized, operating parameters, etc. in order to provide a thorough understanding of the invention. It will be obvious, however, to one skilled in the art that these details are not required to practice the present invention. In other instances, well known procedures and processes are not set forth in detail in order to avoid unnecessarily obscuring the present invention.

Figure 1:
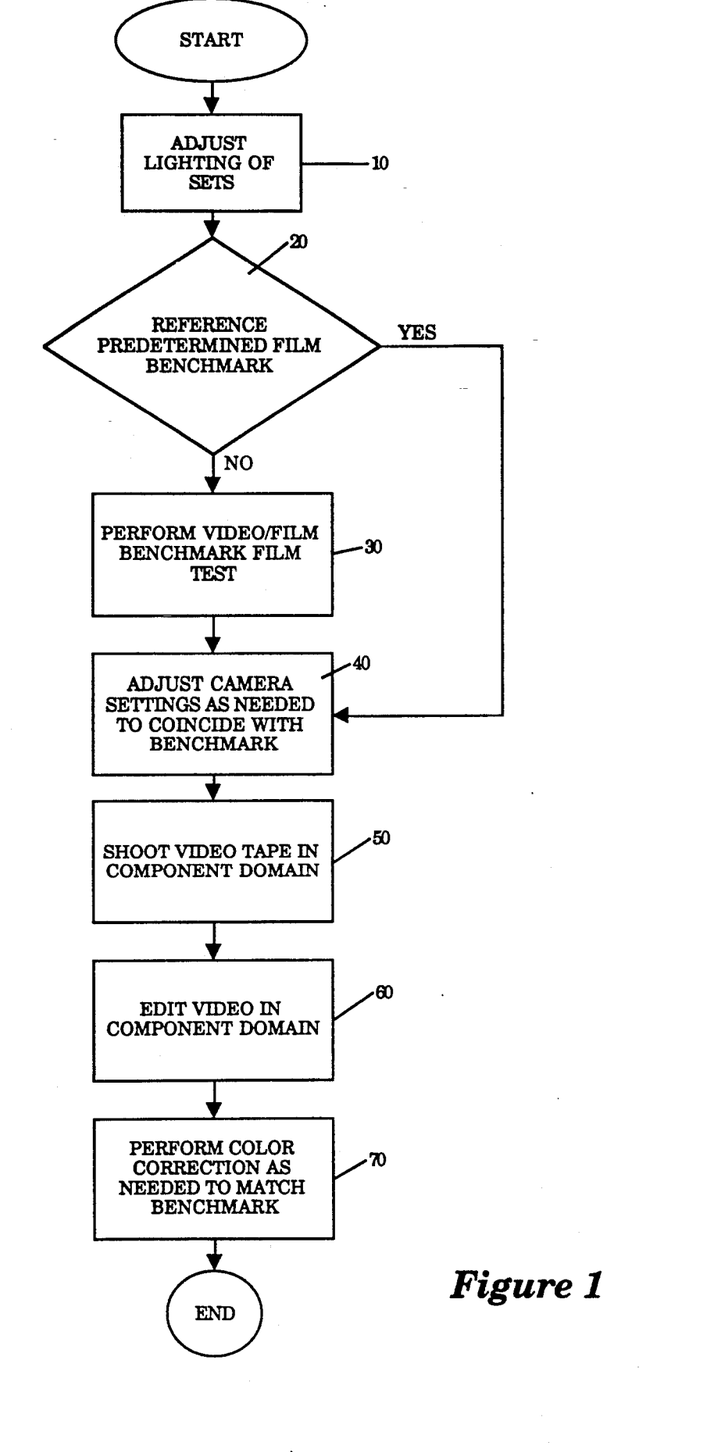
FIG. 1 is a flowchart depicting a preferred embodiment of the process of the present invention.

The preferred embodiment of the process of the present invention is set forth in the flowchart of FIG. 1. In current television production practices, one distinct visual difference between video and film is often the perceived depth of field. By reducing the lighting, a smaller perceived depth of field is achieved in video, thus providing more of a film look. The lighting of the sets is adjusted to be consistent with film lighting techniques for color film stocks comparable in sensitivity to the video camera to be employed to record the videotape image, step 10. Preferably the lighting techniques should follow industry accepted guidelines for shooting film for television release. See, *American Cinematographer Manual*, 6th Edition, edited by Fred H. Detmers (ASC Press, 1986), pp. 332. For example, lighting for a set that produces images that look good when viewed in monochrome and includes intensities which range from detail-less blacks to whites with the greatest number of grey levels in between will most often provide the most acceptable results so long as the lighting does not require the aperture of the video camera to be increased greater than f4.0 in order to produce a quality image.

One distinct advantage of the process of the present invention is the ability to generate a film look on videotape in accordance with the aesthetic taste of the producer of the videotape. Thus, the process can accommodate different types of "film looks" on videotape. To enable the generation of the film look desired, step 20, a film test benchmark is generated, step 30. The benchmark is performed to determine the parameters employed to produce the videotape and post production process the tape to generate the desired film look. This step is required for each type of film look desired. However, once the benchmark test is performed, the information gathered therefrom may be used repetitively to generate consistent film look quality images.

A film test benchmark is shot using an industry accepted grey scale chart, an industry standard chart for color set-up (preferably the Macbeth-Munsell Colorchecker chart) and two charts for backfocus resolution. These charts establish the standards for post production processing. The film shot is transferred to videotape using standard film to videotape processes and is used as a benchmark for color correction, gamma and level correction of the videotape footage subsequently shot. Furthermore, the data gained on depth of field and resolution from the focus charts can be helpful in the selection of lens, apertures and lighting levels utilizing known correspondence among lighting lens and aperture values. For example, if the film test benchmark shows a very deep depth of field compared to the video benchmark, and this is deemed desirable by the producer, then this indicates 1) the need for higher lens apertures to provide a comparable deep depth of field while shooting and 2) the need for high lighting levels to maintain sufficient light levels for the higher aperture. The reference for determining depth of field characteristics for given focal lengths, hyperfocal distance and apertures is available in the *American Cinematographer Manual*, *6th Edition*, starting at page 84. Comparable data on the videotape lens used would be available from the specific lens manufacturer and this information could be used to select the lighting and/or apertures. The film test benchmark can be generated specifically for a given set under specific lighting to be used. Alternatively, a documented, earlier filmed benchmark whose look is desirable can be utilized as the benchmark by referencing the film test benchmark and replicating the conditions under which the film test was shot. For example, information regarding the film stock utilized, film conditions (e.g. temperature) camera, lens, and set lighting levels are used to replicate the film test benchmark for generation of the videotape test portion of the benchmark that is to be compared to the film test benchmark to determine the subsequent adjustments and corrections to be made to generate the film look. The producer can then review the film test to determine the "look" desired.

Once the film test benchmark is performed and the parameters extracted to determine the camera settings and post production color correction, subsequent videotape productions may simply and easily replicate the film look by following the settings dictated by the earlier film test benchmark.

Figure 3:
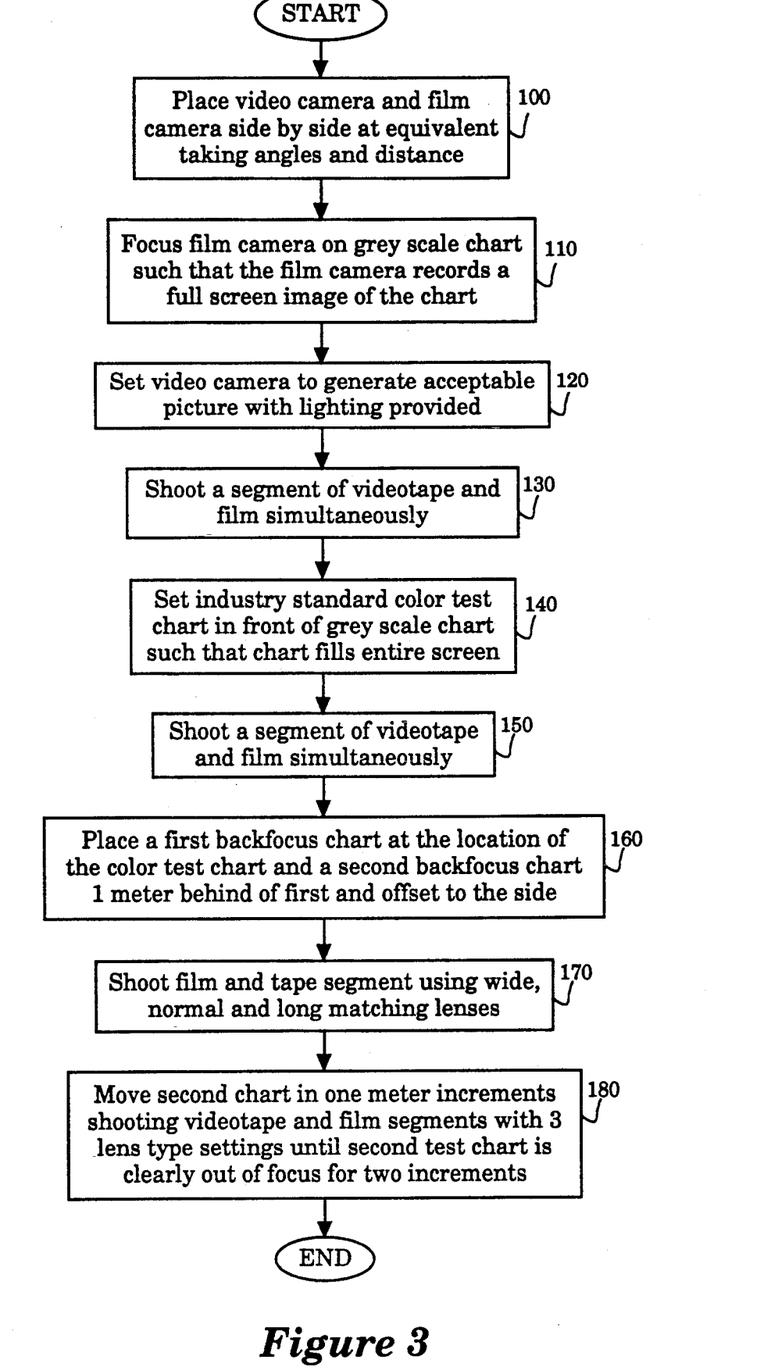
FIG. 3 is a flowchart depicting the film test benchmark process.

The procedure for the film test benchmark is represented by the flow chart of FIG. 3. The film stock and film speed chosen for the film test benchmark should be comparable to the sensitivity of the video camera to be used. Preferably the film stock chosen is in the 320 to 400 ASA range. Typically the sensitivity of film is rated by its ASA number. In video, sensitivity is measured in terms of the aperture (f-stop) at a given light level. Thus, for example, for constant light levels, an increase in ASA corresponds to an increase in aperture (f-stop) number. Similarly, the lens utilized for the film camera should be comparable in function and feature to the lens of the video camera in order to achieve optimum results.

At step 100, the video camera and film camera are placed side by side such that the film segments subsequently shot will be shot at equivalent taking angles and distance. A grey scale chart is set up a predetermined distance away from the cameras and the lenses of both cameras are adjusted, steps 110, such that a full screen image of the grey scale chart is recorded. The video camera, step 120, is set to generate an acceptable picture with the lighting provided. Preferably, the video camera is set to mid-range settings for a viewable image. More particularly, it is preferred that the video camera settings are set to the mid-range values for gamma crossover, horizontal and vertical detail, clipping and black levels in order to shoot images that can be better corrected during post processing. At step 130, a segment of videotape and film is simultaneously shot. The grey scale chart is replaced with an industry standard color test chart such as the Macbeth-Munsell Colorchecker chart, and the lenses of both cameras (video and film) are adjusted such that a full screen image may be recorded on both the film and videotape. A film and videotape segment is then shot, step 150, of the color test chart with no change of exposure.

Back focus charts are then put in place of the color test chart, step 160. The first back focus chart is placed at the location of the color test chart and a second back focus chart is placed slightly offset to a side and approximately one meter behind the first back focus chart. The cameras are focused on the two charts and a segment of film and videotape is shot, step 170, for each of three camera lens settings, wide, normal and long. The second chart is then moved further away from the cameras, in one meter increments keeping both charts in the picture shot. At each incremental distance three segments of video and film are shot at the three lens settings, step 180, until the second chart is clearly out of focus by one or both cameras, preferably for two one-meter increments. Additionally, after the charts have been shot, the set and/or the actors can be shot so that producers can further judge the comparison between film and tape.

Once the film test benchmark is shot, the film is transferred to videotape utilizing a telecine apparatus such as a Mark IIIC with a Digiscan IV, manufactured by Rank Cinetel, London, England. The settings employed are indicative of certain parameters established using an industry standard set-up film such as Eastman Kodak, Telecine Adjustment Film (TAF) and/or Marconi Test Film.

Videotape of the film transferred through the telecine machine and the uncorrected videotape are compared and the differences are noted for matching, for example, through color correction, adjustment to lighting and/or neutral density (ND) filters.

Once the film benchmark test is performed and the information collected, step 40, the camera settings are adjusted to coincide with the parameters of the benchmark.

The videotape is to be shot in either analog or digital component video format. The component video format is a technique to compress the RGB signals without incurring the image degradation found in composite video images. Three signals are generated: Y (representing luminance), R−Y (representing a color difference signal, the red picture with the luminance subtracted, and B−Y (a color difference signal in which luminance is subtracted from the blue signal). The video signals from the camera to the videotape recorder should be component and not composite encoded signals in order to maximize the picture information recorded.

Figure 2:
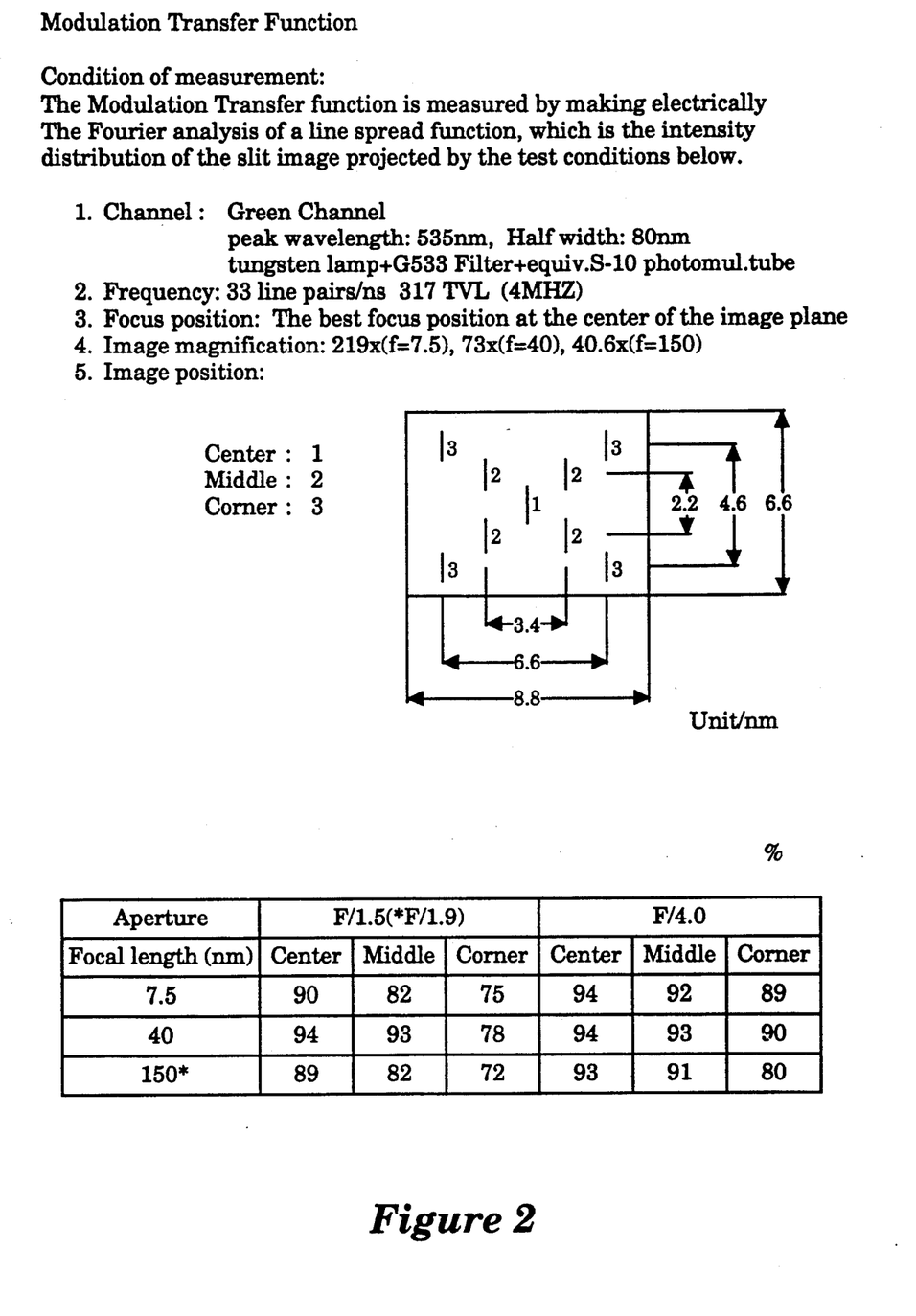
FIG. 2 illustrates the preferred modulation transfer function characteristics for a video camera lens utilized in the process of the present invention.

The video camera employed should be capable of recording video with a sensitivity and dynamic range of a typical professional film stock shot specifically for transfer to videotape. (See, *American Cinematographer Manual*, 6th Edition, page 332). Preferably a charge coupled device (CCD) camera utilizing an increased sensitivity HAD-type CCD such as BVP-37OIS or BVP-7OIS, manufactured by Sony Corporation, is utilized. Therefore it has been determined that the video camera utilized preferably possesses a sensitivity equal to or greater than f8.0 at 2,000 LUX (the video signal measured at 1 volt using 89.9% reflectance chart under 3200K light). Furthermore, the camera should be capable of a dynamic range of at least 600% (that is, the camera should be capable of producing an acceptable picture with a 6 f-stop range from detail-less black picture areas to blocked up white areas). Furthermore, it is preferable that the camera is capable of horizontal luminance resolution equal to or greater than 700 lines and the modulation transfer function of the lens used to shoot the image should have characteristics which are equivalent to or better than the data set forth in FIG. 2. All of the above criteria is utilized to match the sensitivity and dynamic range of a typical professional film stock shot specifically for transfer to videotape.

Most preferably, the lens aperture of the camera is set between f2.4–f3.2 which is found to correspond in sensitivity to film stock ASA 320–400. As noted above, film transferred to video is often characterized by a small depth of field. The depth of field can be decreased further by utilizing a longer lens on the video camera, particularly for close-up and medium shots. This is preferred practice as the background image will be softened and the point of interest in a given shot will appear sharper in comparison minimizing the often described "flat" image produced under normal high aperture video camera lens settings.

Camera settings should coincide with the parameters developed from the benchmark in order to reproduce the same "film look" as indicated to be desirable by the benchmark. For example, such parameters as clipping and black levels may be matched to the benchmark film indicated by the respective IRE measurements on an industry standard waveform monitor. Additionally, the horizontal and vertical detail typically are symmetrical and balanced to the film sample of the benchmark using examples from the focus charts by matching resolution indicated on the focus charts of the benchmark film test.

The gamma crossover on the video camera is preferably set at a mid-range value of approximately fifty units with the first grey chip of a nine step industry standard grey scale test chart set at 10 IRE units. This allows the greatest range of adjustment during subsequent post production efforts at gamma adjustments.

Preferably black or white clipping is not performed during recording in order to maximize the detail and information of the recorded picture. The black and white levels may be subsequently matched during post-production processing. Furthermore, black levels are preferably set at approximately 12–15 units during recording for optimum range of adjustment during post production processing. However, if special effects or special looks are desired, the above settings may vary. For example, if the "look" desired as evidenced by the film test benchmark is very soft and diffused, further adjustments may be made to the horizontal or vertical detail circuits to generate that effect. Alternatively or additionally, a diffusion filter may be added to soften the "look" of the videotape. Generally, if adjustments are to be made to the picture in terms of texture, sharpness or depth, it is preferred that these adjustments are performed by adjustment of the set lighting and camera detail, lens and aperture using known, standard industry techniques. However adjustment to picture levels, e.g., video, chroma, black, are preferably handled in post processing so as to insure the production of quality images desired.

Once the videotape is shot, the videotape is edited, step 60. To maintain the quality of the image, the on-line editing is preferably done in the component domain, most preferably in the digital component domain utilizing BETA SP or D1 formats.

After the videotape has been edited, the videotape undergoes color correction, step 70, utilizing a commercially available color correction system capable of both primary and secondary correction, such as the da Vinci color corrector, manufactured by Dynatech Corporation. The videotape benchmark is corrected to match the film test benchmark. More particularly, the amount of color correction required is dictated by the difference in hue, saturation, luminance and gamma levels as measured between the film and videotape benchmark tests. Thus, the hue saturation, luminance and gamma levels of the videotape benchmark is matched to those of the film benchmark. Preferably this color correction is performed in the digital component domain. The comparison and matching process can be measured on industry standard waveform monitors (such as the Magni Model WFM 530 scope, manufactured by Magni Corporation) and/or compared visually using broadcast quality color video monitors in order to achieve the optimum match between the film and video benchmarks.

To maximize the effectiveness of the process, it is preferred that the camera includes circuitry to record chroma information at high saturation levels for subsequent modification during the post production color correction process. Instead of adding chroma information during color correction, it has been determined that optimum results are achieved by recording at high chroma saturation levels and removing unwanted saturation levels during post-production color correction. This is accomplished utilizing a color matrix board, such as the Sony EBU color matrix board, part no. 1-809-110-21, manufactured by Sony Corporation, or adjusting the camera's color masking circuitry (such as the color masking circuitry found in video camera model number BVP-70IS manufactured by Sony Corporation) to increase the chroma saturation levels to match PAL standards. The EBU matrix specified for the camera changes the RGB values to emulate the PAL standard CIE landing points. The EBU matrix coefficients are 0.299 E'R, 0.587 E'G, and 0.114 E'B (where ' indicates a gamma corrected signal) for PAL CIE chromaticity coordinates red (0.64, 0.33), green (0.29, 0.60) and blue (0.15, 0.06).

Once the videotape benchmark has been color corrected in order to match the film test benchmark, the videotape images shot (i.e., the videotape for which a film look is to be added) can be color corrected using the settings determined by comparison of the film test benchmark and videotape benchmark. The resultant videotape images recorded have the look which closely matches the film utilized in the film test benchmark, without unnecessary signal noise and artifacts. Furthermore, due to minimal original noise and artifacts, the images are easily and cleanly transferred to other mediums maintaining a high quality image.

While the invention has been described in conjunction with the preferred embodiment, it is evident that numerous alternatives, modifications, variations and uses will be apparent to those skilled in the art in light of the foregoing description. For example, although optimum results are achieved by performing the color correction process described herein adjustment to camera levels, the processes may be performed independently of one another to provide a film look to the videotape image. Similarly, one step of adjusting the lighting of the sets need not be performed in conjunction with the color correction process or adjustment to camera levels in order to achieve a film look.

We claim:

1. A process for generating videotape images on a videotape using a video camera, the video camera including a lens and a plurality of settings, the video images having the look of film images, said process comprising the steps of:

adjusting the lighting of a set to be shot to a lighting level consistent with film lighting techniques employed for color film stock comparable in sensitivity to the sensitivity of the video camera;

performing a film test and a video benchmark test of a film look desired to determine which of the plurality of video camera settings and post production processes to be performed to the videotape, comprising the steps of;

providing a film camera which uses a lens comparable to the lens of the video camera;

placing the film camera and the video camera side by side, such that segments for the film test and the video benchmark test are shot at an equivalent taking angle and distance;

setting a grey scale chart equidistant away from the film camera and video camera;

initially adjusting the settings of the video camera to produce a visually acceptable picture of the grey scale chart;

concurrently shooting a first segment of film and a first segment of videotape of the grey scale chart;

replacing the grey scale chart with a color test chart;

concurrently shooting a second segment of film and a second segment of videotape of the color test chart;

replacing the color test chart with a first and a second backfocus chart, the first backfocus chart disposed at the location of the color test chart and the second backfocus chart located offset to the side of the first backfocus chart and a predetermined distance behind the first backfocus chart;

adjusting the focus of the film and video cameras to film the first and second backfocus charts;

concurrently shooting a third segment of film and a third segment of videotape;

moving the second backfocus chart away from the film and video cameras at increments of the predetermined distance, until the second backfocus chart is out of focus;

concurrently shooting a fourth segment of film and a fourth segment of videotape at each increment; and transferring the first, second, third and fourth segments of film to a fifth segment of videotape;

adjusting the video camera settings according to differences between the film test benchmark and video benchmark test;

shooting the videotape benchmark test using the videotape camera;

color correcting the video benchmark test to the film benchmark test by adjusting levels of the video benchmark test to be comparable to the film test benchmark;

shooting the video images on the videotape using the video camera;

color correcting the videotape images by using the same adjusted levels used to color correct the videotape benchmark test;

whereby videotape images are recorded which have the look which closely matches the film look of the film test benchmark without the addition of signal noise and artifacts.

2. The process as set forth in claim 1, wherein the step of adjusting the lighting of the set, adjust the lighting such that images recorded look good when viewed in monochrome and include intensities which range from detailless blacks to whites.

3. The process as set forth in claim 1, wherein the step of performing a film test and a video benchmark test further comprises the step of determining the film stock and film speed to be used in the film camera to be comparable to the sensitivity of the video camera.

4. The process as set forth in claim 3, wherein the film stock is in the range of 320–400 ASA.

5. The process as set forth in claim 1, wherein the predetermined distance is one meter.

6. The process as set forth in claim 1, wherein the third segments of film and video tape are shot of the backfocus charts for each of three camera lens settings, wide, normal and long.

7. The process as set forth in claim 1, wherein the video camera is capable of recording video with a sensitivity and dynamic range of film stock shot specifically for transfer to videotape.

8. The process as set forth in claim 7, wherein the video camera is a charge coupled device (CCD) camera.

9. The process as set forth in claim 1, wherein the aperture of the video camera lens is set in the range of f2.4 to f3.2.

10. The process as set forth in claim 1, wherein the video images on the videotape are shot and recorded in a component video format.

11. The process as set forth in claim 1 wherein the step of adjusting the video camera settings comprises setting the horizontal and vertical detail to be symmetrical and balanced to the film test benchmark by matching the resolution indicated on the backfocus charts filmed by the film camera.

12. The process as set forth in claim 1 wherein the step of adjusting the video camera settings comprises adjusting a clipping level setting on the video camera.

13. The process as set forth in claim 1 wherein the step of adjusting the video camera settings comprises adjusting a black level setting on the video camera.

14. The process as set forth in claim 1 wherein the step of color correcting the video benchmark test to the film test benchmark comprises adjusting hue, saturation, luminance and gamma levels of the video benchmark test respectively to the hue, saturation, luminance and gamma levels of the film test benchmark.

15. The process as set forth in claim 14 wherein the step of color correcting the videotape images comprises using hue, saturation, luminance and gamma levels adjustments utilized to color correct the video benchmark test.

16. The process as set forth in claim 1 wherein the step of initially adjusting the video camera settings comprises setting the gamma crossover on the video camera to a mid-range value which provides for the greatest range of adjustment during the step of color correction.

17. The process as set forth in claim 16 wherein the step of initially adjusting the video camera settings comprises setting the gamma crossover on the video camera at approximately fifty units with the fist grey chip of a nine step grey scale chart set a 10 IRE units.

18. The process as set forth in claim 1 wherein the step of initially adjusting the video camera settings comprises setting a black and white clipping setting on the video camera to a mid-range value which provides for the greatest range of adjustment during the step of color correction.

19. The process as set forth in claim 18 wherein the step of initially adjusting the video camera settings comprises setting the black and white clipping on the video camera to a no clipping setting to maximize the detail and information of the video images.

20. The process as set forth in claim 1 wherein the step of initially adjusting the video camera settings comprises setting a black level setting to a mid-range value which provides for the greatest range of adjustment during the step of color correction.

21. The process as set forth in claim 1 wherein the step of initially adjusting the video camera settings comprises setting the black level to 12-15 units.

22. The process as set forth in claim 1 wherein the step of initially adjusting the video camera settings comprises setting the video camera to accommodate high color saturation levels.

23. The process as set forth in claim 1, further comprising providing a color matrix board to record the videotape images at high color saturation levels.

24. A process for generating videotape images on a videotape using a video camera, the video camera including a lens and a plurality of settings, the video images having the look of film images, said process comprising the steps of:
adjusting the lighting of a set to be shot to a lighting level consistent with film lighting techniques employed for color film stock comparable in sensitivity to the sensitivity of the video camera;
performing a film test benchmark and a video benchmark test of a film look desired to determine which of the plurality of video camera settings and post production processes to be performed to the videotape, comprising the steps of;
providing a film camera which uses a lens comparable to the lens of the video camera;
placing the film camera and the video camera side by side, such that segments for the film test and the video benchmark test are shot at an taking angle and distance;
initially adjusting the settings of the video camera to produce a visually acceptable picture of the chart;
shooting segments of film and videotape of a grey scale chart, a color test chart and at least one backfocus chart;
transferring the film shot to videotape;
adjusting the video camera settings according to differences between the film test benchmark and video benchmark test;
shooting the video benchmark test using the video camera;
color correcting the video benchmark test to the film test benchmark by adjusting levels of the video benchmark test to be comparable to the film test benchmark; and
color correcting the videotape images by using the same adjusted levels used to color correct the video benchmark test;
whereby videotape images are recorded which have the look which closely matches the film look of the film test benchmark without the addition of signal noise and artifacts.

25. A process for generating videotape images on a videotape using a video camera, the video camera including a lens and a plurality of settings, the video images having the look of film images, said process comprising the steps of:
adjusting the lighting of a set to be shot to a lighting level consistent with film lighting techniques employed for color film stock comparable in sensitivity to the sensitivity of the video camera;
performing a film test and a video benchmark test of a film look desired to determine which of the plurality of video camera settings to be used to shoot the videotape images, comprising the steps of;
providing a film camera which uses a lens comparable to the lens of the video camera;
placing the film camera and the video camera side by side, such that segments for the film test and the video benchmark test are shot at an equivalent taking angle and distance;
initially adjusting the settings of the video camera to produce a visually acceptable picture of a grey scale chart;
shooting segments of film and videotape of the grey scale chart, color chart and at least one backfocus chart;
adjusting the video camera settings according to differences between the film test benchmark and video benchmark test;

whereby videotape images subsequently shot and recorded which will have a film look which corresponds to the film look of the film test benchmark without the addition of signal noise and artifacts.

26. The process as set forth in claim 25, wherein the step of shooting segments of film and videotape for performing a film test and video benchmark comprises the steps of:

setting the grey scale chart equidistant away from the film camera and video camera;

concurrently shooting a segment of film and videotape of the grey scale chart;

replacing the grey scale chart with a color test chart;

concurrently shooting a segment of film and videotape of the color test chart;

replacing the color test chart with a first and second backfocus chart, said first backfocus chart disposed at the location of the color test chart and the second backfocus chart located offset to the side of the first chart and a predetermined distance behind the first chart;

adjusting the focus of the film and video cameras to film the first and second backfocus charts;

concurrently shooting a segment of film and videotape;

moving the second backfocus chart away from the cameras at increments of the predetermined distance, until the second backfocus chart is out of focus; and concurrently shooting a segment of film and videotape at each increment.

27. The process as set forth in claim 26, wherein the predetermined distance is one meter.

28. The process as set forth in claim 26, wherein segments of film and video tape are shot of the backfocus charts for each of three camera lens settings, wide, normal and long.

29. The process as set forth in claim 25, wherein the video camera is capable of recording video with a sensitivity and dynamic range of film stock shot specifically for transfer to videotape.

30. The process as set forth in claim 25, wherein the aperture of the video camera lens is set in the range of f2.4 to f3.2.

31. The process as set forth in claim 25, wherein the videotape is shot and recorded in the component video format.

32. The process as set forth in claim 25 wherein the step of adjusting the video camera settings comprises setting the horizontal and vertical detail to be symmetrical and balanced to the film test benchmark by matching the resolution indicated on the backfocus charts filmed by the film camera.

33. The process as set forth in claim 25 wherein the step of adjusting the video camera settings comprises adjusting a clipping level setting on the video camera.

34. The process as set forth in claim 25 wherein the step of adjusting the video camera settings comprises adjusting a black level setting on the video camera.

35. The process as set forth in claim 25 wherein the step of initially adjusting the video camera settings comprises setting a gamma crossover setting on the video camera to a mid-range value which provides for the greatest range of adjustment during the step of color correction.

36. The process as set forth in claim 35 wherein the step of initially adjusting the video camera settings comprises setting the gamma crossover on the video camera at approximately fifty units with a grey chip of a nine step grey scale chart set a 10 IRE units.

37. The process as set forth in claim 25 wherein the step of initially adjusting the video camera settings comprises setting a black and white clipping setting on the video camera to a mid-range value which provides for the greatest range of adjustment during the step of color correction.

38. The process as set forth in claim 37 wherein the step of initially adjusting the video camera settings comprises setting the black and white clipping setting on the video camera to a no clipping in order to maximize the detail and information of the recorded picture.

39. The process as set forth in claim 25 wherein the step of initially adjusting the video camera settings comprises setting the black level to a mid-range value which provides for the greatest range of adjustment during the step of color correction.

40. The process as set forth in claim 25 wherein the step of initially adjusting the video camera settings comprises setting the black level to 12-15 units.

41. A process for generating videotape images on a videotape using a video camera, the video camera including a lens and a plurality of settings, the video images having the look of film images, said process comprising the steps of:

adjusting the lighting of a set to be shot to a lighting level consistent with film lighting techniques employed for color film stock comparable in sensitivity to the sensitivity of the video camera;

performing a film test and a video benchmark test of a film look desired to determine which of the plurality of video camera settings and post production processes to be performed to the videotape, comprising the steps of;

providing a film camera which uses a lens comparable to the lens of the video camera;

placing the film camera and the video camera side by side, such that segments for the film test and the video benchmark test are shot at an equivalent taking angle and distance;

adjusting the settings of the video camera to produce a visually acceptable picture of a grey scale chart;

shooting segments of film and videotape of the grey scale chart, a color test chart and at least one backfocus chart;

transferring the film shot to videotape; shooting the videotape benchmark using the videotape camera;

color correcting the videotape benchmark to the film benchmark by adjusting levels of the video benchmark test to be comparable to the film test benchmark; and color correcting the videotape images by using the same adjusted levels used to color correct the video benchmark test;

whereby videotape images are recorded which have the look which matches the film look of the film test benchmark without the addition of signal noise and artifacts.

42. The process as set forth in claim 41, wherein the step of shooting segments of film and videotape for performing a film test and video benchmark test comprises the steps of:

setting the grey scale chart equidistant away from the film camera and video camera;

concurrently shooting a segment of film and videotape of the grey scale chart;
replacing the grey scale chart with a color test chart;
concurrently shooting a segment of film and videotape of the color test chart;
replacing the color test chart with a first and second backfocus chart, said first backfocus chart disposed at the location of the color test chart and the second backfocus chart located offset to the side of the first backfocus chart and a predetermined distance behind the first backfocus chart;
adjusting the focus of the film and video cameras to film the first and second backfocus charts;
concurrently shooting a segment of film and videotape;
moving the second backfocus chart away from the film and video cameras at increments of the predetermined distance, until the second backfocus chart is out of focus; and
concurrently shooting a segment of film and videotape at each increment.

43. The process as set forth in claim 41 wherein the step of color correcting the video benchmark test to the film test benchmark comprises adjusting hue, saturation, luminance and gamma levels of the videotape benchmark respectively to the hue, saturation, luminance and gamma levels of the film test benchmark.

44. The process as set forth in claim 43 wherein the step of color correcting the videotape images comprises using hue, saturation, luminance and gamma levels adjustments utilized to color correct the video benchmark test.

* * * * *